United States Patent
Hinckley et al.

[15] 3,686,362
[45] Aug. 22, 1972

[54] FLAME RESISTANT COMPOSITION OF ABS, POLYARYLENE POLYSULFONE AND BROMO-ARYL COMPOUND

[72] Inventors: Paul D. Hinckley, Woodbury; Gerald J. Klender, Naugatuck, both of Conn.; Jerry F. Lambiotte, Westland, Mich.

[73] Assignee: Uniroyal, Inc., New York, N.Y.

[22] Filed: May 22, 1970

[21] Appl. No.: 39,631

[52] U.S. Cl.....260/876 R, 260/45.7 R, 260/45.75 R, 260/49, 260/887, 260/893, 260/DIG. 24
[51] Int. Cl............................C08f 41/12, C08f 45/58
[58] Field of Search.......................260/876, 880, 893

[56] References Cited

UNITED STATES PATENTS

| | | | |
|---|---|---|---|
| 3,405,199 | 10/1968 | Snedeker | 260/887 |
| 3,555,119 | 1/1971 | Ingulli et al. | 260/876 |
| 3,472,799 | 10/1969 | Burger et al. | 260/876 |
| 3,442,980 | 5/1969 | Grabowski | 260/880 |
| 3,075,944 | 1/1963 | Wick et al. | 260/41 |

*Primary Examiner*—Samuel H. Blech
*Assistant Examiner*—Helen W. Roberts
*Attorney*—James J. Long

[57] ABSTRACT

Thermoplastic blend of ABS, polyarylene poly-sulfone resin [e.g. condensation product of the dipotassium salt of 2,2-bis-(4-hydroxyphenyl) propane and 4,4'-dichlorodiphenyl-sulfone], and bromo-aryl compound (hexabromobenzene or hexabromodiphenylether), with or without antimony oxide, is self-extinguishing, has high heat distortion temperature, and good processing characteristics.

21 Claims, 1 Drawing Figure

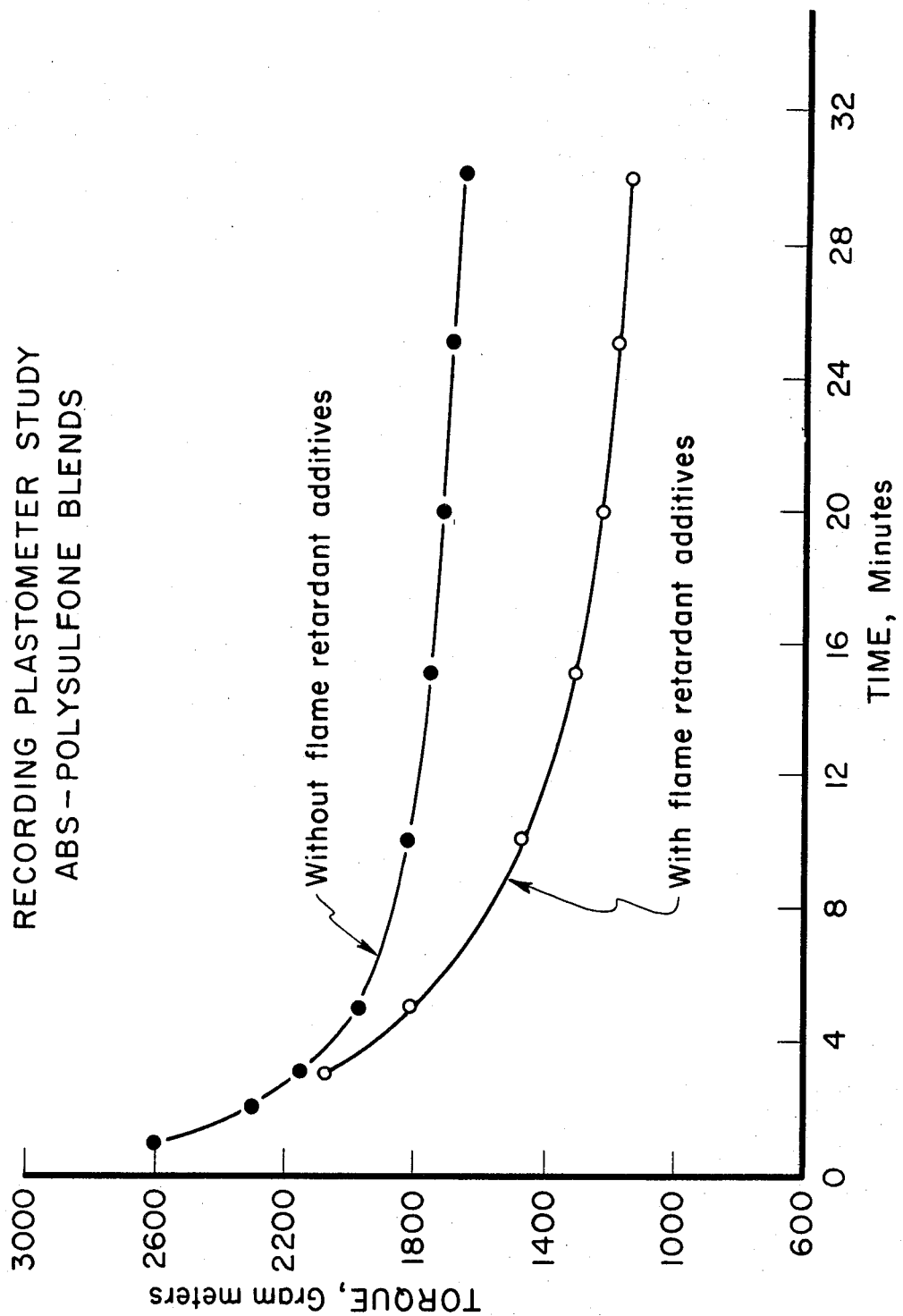

FLAME RESISTANT COMPOSITION OF ABS, POLYARYLENE POLYSULFONE AND BROMO-ARYL COMPOUND

BACKGROUND OF THE INVENTION

1. Field of the Invention

This invention relates to a flame-resistant thermoplastic composition.

2. Description of the Prior Art

Thermoplastic blends of ABS gum plastic with polyarylene polysulfone resins are disclosed in U.S. Pat. No. 3,555,119, Jan. 12, 1971, Ingulli et al.

U.S. Pat. No. 3,442,997, Grabowski, May 6, 1969, discloses a blend of an ABS graft polymer and chlorinated polyethylene, such blend further containing chlorine or bromine substituted carboxylic acids or anhydrides.

U.S. Pat. No. 3,442,980, Grabowski, May 6, 1969, discloses chloro- and bromo-substituted carboxylic acids and anhydrides blended with ABS graft polymers; antimony oxide may be present.

U.S. Pat. Nos. 2,727,824, Dec. 20, 1955 and 2,698,806, Jan. 4, 1955, of Horst show hexachlorobenzene in ethyl cellulose plastics and cellulose acetate, respectively.

U.S. Pat. No. 2,802,037, Pennino, Aug. 6, 1957, discloses a process for manufacturing hexabromobenzene.

SUMMARY OF THE INVENTION

Certain blends of ABS gum plastic with polyarylene polysulfone resin disclosed in the prior art unfortunately are not as flame retardant as would be desirable in some applications. The present invention is based on the discovery that by addition of bromo-aryl compound to the blend, thermoplastic resin compounds with excellent self-extinguishing properties are produced without significantly altering the desirable physical or chemical properties of the unmodified blends, and, in fact, the processing characteristics are significantly improved while retaining high heat distortion temperature and excellent impact strength.

BRIEF DESCRIPTION OF THE DRAWING

In the accompanying drawing, the single FIGURE is a graph representing flow properties as determined in a recording plastometer.

DETAILED DISCLOSURE

The expression "ABS gum palstic" is used herein in its conventional sense to designate the known thermoplastic polymeric compositions containing combined acrylonitrile, butadiene, and styrene, also called ABS resins or ABS graft copolymers, described for example in U.S. Pat. Nos. 2,439,202, L.E. Daly, Apr. 6, 1948; 2,600,024, H. Romeyn, Jr. et al., June 10, 1952; 2,820,773, C.W. Childers, Jan. 21, 1958; 3,111,501, M.S. Thompson, Nov. 18, 1963; 3,198,853, R.L. Bergen, Jr., Aug. 3, 1965 and 3,261,887, J.U. Mann, July 19, 1966. As is well known to those skilled in the art, the ABS plastic may be of the graft copolymer type, or of the physical blend type (polyblend), or a combination of the two. The conventional ABS graft copolymers are made by graft copolymerizing resin-forming monomers, such as styrene and acrylonitrile, on a previously prepared polybutadiene rubber spine, or a butadiene-styrene copolymer rubber spine; in the final graft copolymer the resinous portion and the rubbery portion are in part chemically combined. The so-called graft copolymer in actual practice contains some ungrafted resin, that is, not all of the resin-forming monomers become grafted to the rubbery spine polymer in the course of the graft polymerization process. The graft copolymer may be made by an emulsion polymerization technique, in which a previously prepared latex of polybutadiene or similar rubber, which serves as a spine, is subject to emulsion polymerization conditions with a monomeric mixture of styrene and acrylonitrile emulsified therein. Alternatively, graft copolymer may be prepared by solution polymerization methods, or by so-called bulk-suspension technique. On the other hand, the physical blend type of ABS is typically a mixture of butadiene-acrylonitrile rubber with separately prepared styrene-acrylonitrile resin. Frequently the graft polymer type of ABS includes additional separately prepared styrene-acrylonitrile resin blended with the graft copolymer. Any such type of ABS resin is suitable for blending with the thermoplastic polysulfone resin in accordance with the invention. Moreover, if desired, other styrene-type monomer (such as alpha-methylstyrene) may be substituted for some or all of the styrene itself and other acrylic monomers (such as methacrylonitrile, ethyl acrylate, methyl methacrylate) may be substituted for some or all of the acrylonitrile-type monomer.

Since the ABS material has both a rubbery component (e.g. polybutadiene or butadiene-styrene spine or butadiene-acrylonitrile copolymer component) and a resinous component (styrene-acrylonitrile), it may therefore be regarded as a "gum plastic" type of material. Usually the proportion of the rubbery component in the ABS is from 5 to 35 percent, while the proportion of resin is correspondingly from 95 to 65 percent. The overall proportion of acrylonitrile, butadiene and styrene-type monomer usually falls within the ranges: 10 to 40 percent acrylonitrile; 5 to 65 percent butadiene; and 25 to 85 percent styrene.

The M.S. Thompson U.S. Pat. No. 3,111,501, referred to above as disclosing ABS resins of the kind employed in the invention, is directed to the type of ABS made by blending alpha-methylstyrene-acrylonitrile resin with a graft copolymer of styrene and acrylonitrile on polybutadiene. Thus, for example, there may be employed in this invention the compositions made by blending alpha-methylstyrene/acrylonitrile resin (69/31) (Thompson, col. 2, lines 34–35) with a graft copolymer of styrene/acrylonitrile (70/30 ratio) monomers on polybutadiene latex (46 percent styrene/acylonitrile and 54 percent rubber solids) (Thompson, col. 3, lines 32–37). Thompson also discloses, at col. 1, lines 68–70, that some or all of the styrene in the graft copolymer may be replaced by alpha-methylstyrene. Likewise, Mann U.S. Pat. No. 3,261,887, col. 5, lines 48, 49; col. 10, Tables 6 and 7; col. 11, lines 50, 51, 54, 55 discloses alpha-methylstyrene as the comonomer with butadiene to make alpha-methylstyrene-butadiene copolymer spine for grafting, while Grabowski U.S. Pat. No. 3,130,177, col. 4, lines 13–15, discloses replacement of the styrene, in part or entirely, by alpha-methyl-styrene, in the preparation of the graft copolymer. Similarly, the R.L. Bergen, Jr., U.S. Pat. No. 3,198,853 referred to previously shows ABS containing graft copolymer of styrene and acrylonitrile on polybutadiene blended with separately prepared resinous copolymer of alpha-methylstyrene and acrylonitrile. Thus, at column 2, lines 39-42, Bergen, Jr., discloses blending the graft copolymer with a separately prepared resinous copolymer of styrene or alpha-methylstyrene and acrylonitrile. At column 4, lines 6-12, Bergen Jr., discloses a blend of 35 parts of a graft copolymer of 50 parts of styrene and acrylonitrile (ratio 70/30) on 50 parts of polybutadiene rubber, blended with 65 parts of separately prepared resinous copolymer of alpha-methylstyrene and acrylonitrile (ratio 69/31). Any such types of ABS may be employed in this invention.

The polysulfone resin component of the blend may be described as a linear, thermoplastic polyarylene polyether polysulfone, wherein the arylene units are interspersed with ether and sulfone linkages. Reference may be had to U.S. Pat. No. 3,264,536, H.B. Robinson et al. Aug. 7, 1966, British Pat. No. 1,060,546, 1967, Minnesota Mining and Manufacturing Co., and U.S. application, Ser. No. 847,427, R.J. Cornell filed Aug. 4, 1969, for descriptions of such resins. These resins may be obtained by reaction of an alkali metal double salt of a dihydric phenol and a dihalobenzenoid compound, either or both of which contain a sulfone linkage —$SO_2$— between arylene groupings, to provide sulfone units in the polymer chain in addition to arylene units and ether units. The polysulfone polymer has a basic structure composed of recurring units of the formula:

$$-O-E-O-E'-$$

wherein E is the residuum of the dihydric phenol and E' is the residumm of the benzenoid compound having an inert electron withdrawing group in at least one of the positions ortho and para to the valence bonds; both of said residua are valently bonded to the ether oxygens through aromatic carbon atoms; at least one of said residua (E or E' or both) provides a sulfone linkage between aromatic carbon atoms. Such polysulfones are included within the class of polyarylene polyether resins described in U.S. Pat. No. 3,264,536, referred to above, the disclosure of which is hereby incorporated herein by reference for the purpose of describing and exemplifying E and E' in more detail, including the preferred forms of E derived from dinuclear phenols having the structure:

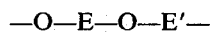

as defined therein, with the further limitation that either E or E' must be so selected, from the values of E and E' disclosed in said patent, as to contain a sulfone linkage to provide sulfone units in the final polymer chain. Thus, if E is so selected as not to contain the sulfone linkage, then E' must be selected from one of the forms containing sulfone linkage; if E' is so selected as not to contain a sulfone linkage, then E must be selected from one of the forms containing a sulfone linkage. Of course, E and E' may both contain sulfone linkages if desired. Typical preferred polymers are composed of recurring units having the formula:

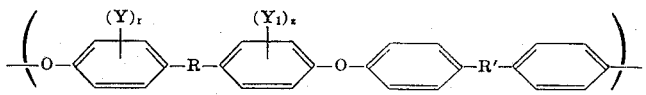

as described in the Robinson et al. patent, particularly column 4, line 69 to column 5, line 3, wherein it is disclosed that R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ may be the same or different and each represent inert substituent groups selected from the group consisting of halogen (fluorine, chlorine, bromine or iodine), alkyl groups having from one to four carbon atoms and alkoxy groups having from one to four carbon atoms and where r and z are integers having a value from 0 to 4 inclusive, with the further proviso that at least one of R and R' must be —$SO_2$—. Typically R is representative of a bond between aromatic carbon atoms or a divalent connecting radical and R' represents sulfone. Preferably R represents a bond between aromatic carbon atoms. Even more preferred are the thermoplastic polyarylene polysulfones of the above formula wherein r and z are zero, R is a divalent connecting radical of the formula:

wherein R" represents, as exemplified in Robinson et al., a member of the group consisting of alkyl, lower aryl, and the halogen substituted groups thereof, and R' is a sulfone group.

Typical examples are the reaction products prepared from 2,2-bis-(4-hydroxyphenyl) propane (source of E residue) with 4,4'-dichlorodiphenylsulfone (source of E' residue) and equivalent reaction products such as those from 4,4'-dichlorodiphenylsulfone with bisphenol of benzophenone (4,4'-dihydroxydiphenyl ketone), or the bisphenol or acetophenone [1,1-bis-(4-hydroxyphenyl) ethane], or the bisphenol of vinyl cyclohexane [1-ethyl-1-(4-hydroxyphenyl)-3-(4-hydroxphenyl)cyclohexane], or 4,4'-dihydroxydiphenyl sulfone (see Examples 1, 3, 4, 5 and 7 of Robinson et al.), or alpha, alpha'-bis (4-hydroxyphenyl)-p-diisopropylbenzene (see copending application, Ser. No. 847,427 of R.J. Cornell referred to above). Further useful discussion of the polysulfone resins which may be used is to be found in British Pat. No. 1,060,546, referred to above. Ordinarily at least about 10 percent and preferably at least about 20 percent of the linkages between the arylene groups are sulfone groups:

Apart from the ether and sulfone linkages, arylene groups may be bonded directly to each other or may be separated by inert groups, e.g., alkylidene groups such as isopropylidene groups, which latter appear in the chain when bisphenol A [2,2-bis(4-hydroxyphenyl) propane] is used in the preparation of the polysulfone.

In most cases, the relative proportions of ABS plastic to polysulfone resin range from 10 to 90 parts of ABS, and correspondingly from 90 to 10 parts of polysulfone resin per 100 parts by weight of ABS plus polysulfone. A preferred range for the amount of polysulfone resin in the blend is from 30 to 70 parts by weight, with correspondingly from 70 to 30 parts by weight of ABS material. In general the blend preferably contains at least 48 parts by weight, most preferably about 48–60 parts, of polysulfone resin.

The foregoing known blends of thermoplastic polysulfone resin with ABS gum plastic are characterized by a combination of useful properties, particularly high heat distortion temperature, excellent impact strength and ease of processability. However, even though the polysulfone resin itself is self-extinguishing by such tests as the Underwriters' Laboratories Subject No. 746 test (formerly UL No. 94), ABS-polysulfone resin blends containing sufficient ABS to impart the most desirable physical properties do not perform as well as would be desired in this stringent test. The present invention is, as indicated, directed to rendering the blend remarkably self-extinguishing, and the invention accomplishes this by including in the blend a bromo-aryl compound, particularly the fully brominated benzene, hexabromobenzene, or hexabromodiphenylether, also known as hexabromodiphenyloxide. The latter may be represented by the formula:

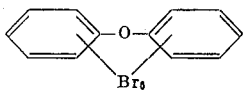

If desired, additional materials which contribute to flame-retardency, such as anitmony oxide, may be incorporated into the blend along with the bromo-aryl compound. By the addition of hexabromobenzene or hexabromodiphenylether, with or without antimony oxide, to the ABS-polysulfone resin blend, thermoplastic resin compositions with excellent self-extinguishing properties are produced without significantly altering the physical or chemical properties of the unmodified blends. Furthermore, processing characteristics of the self-extinguishing blends as measured by Mooney viscometer or by Brabender plasticorder are significantly improved. This effect is unexpected because the addition of hexabromobenzene or hexabromodiphenylether to ABS-type polymers causes a considerable reduction in the impact strength especially at concentrations which produce effective flame retardancy.

To prepare the blend of the invention, the two starting polymers, namely, ABS material and thermoplastic polyarylene polysulfone resin, and the hexabromobenzene or hexabromodiphenylether, with or without other ingredients such as antimony oxide are mixed together with the aid of any suitable mixing device conventionally used for mixing rubbers or plastics, such as a differential roll mill or an internal mixer. In order to facilitate thorough mixing of the polymers and to develop the desired improved combination of physical properties, the mixing is carried out at elevated temperatures, sufficient to soften the polymers so that they are thoroughly dispersed and intermingled with each other. The mixing temperature will in general vary with the particular ABS and the particular polysulfone employed; usually the polysulfone, which is the higher-softening material, will govern the mixing temperature selected. The mixing is continued until a uniform blend is obtained. The order of addition of the ingredients may be suitably varied as desired. In one procedure for making the self-extinguishing blend of the invention, all of the ingredients are charged initially to a mixer, such as a Banbury, intensely mixed, then sheeted out on a mill, and converted into a convenient form for example by dicing. According to another procedure, the two resins are mixed until fluxed, and the bromo-aryl compound (as well as antimony oxide or other ingredients if desired) is added, and further mixed. Alternatively, the two resins may be blended, sheeted and diced, and thereafter returned to a mixer where the bromo-aryl compound (with antimony oxide if desired) is added and mixed in thoroughly.

The proportion of hexabromobenzene or hexabromodiphenylether in the self-extinguishing resin composition of the invention may vary, depending particularly on such variables as the degree of flame-resistance desired, the particular polysulfone resin employed, and the amount of polysulfone resin in the blend, and the presence or absence of other substances contributing to flame-retardancy, such as antimony oxide. For purposes of the invention there is usually employed at least about 2 parts of hexabromobenzene or hexabromodiphenylether per 100 parts by weight of ABS resin plus polysulfone resin in the blend. Frequently the hexabromobenzene or hexabromodiphenylether content will vary from about 4 parts to 14 parts. While there is no critical upper limit to the amount of hexabromobenzene or hexabromodiphenylether employed it is usually not necessary or desirable to use more than about 20 parts. In those compositions of the invention which do not include antimony oxide the content of hexabromobenzene or hexabromodiphenylether preferably varies between 4 and about 14 parts. In those compositions of the invention which contain antimony oxide the hexabromobenzene or hexabromodiphenylether content usually varies between about 4 parts and 14 parts, preferably 4 to 7.5 parts. The antimony oxide usually varies between about 1 and about 8 parts, and is preferably within the range of 1.5 to 5 parts. Within the ranges stated it will usually be found that the best results in the flammability tests are achieved by the combination of highest polysulfone resin content, highest sulfone content in the polysulfone resin and highest concentration of bromo-aryl compound and antimony oxide. With the blends of relatively low sulfone content (whether because they contain a low amount of polysulfone resin, or whether because the polysulfone resin has a small content of —

SO₂— linkages, or both) it is particularly desirable to use a high content of bromo-aryl compound. Conversely, low contents of bromo-aryl compound are more suitably employed in compositions containing a high amount of sulfone (whether because of the presence of a large amount of polysulfone resin, or because the polysulfone resin has a high content of —SO₂— linkages, or both).

Various flammability tests may be used to measure the burning characteristics of the plastic compositions of the invention. Two tests accepted by the plastics industry are the Underwriters' Laboratories test No. 746 and the General Electric flammability index test. These tests give reproducible results which are meaningful from the standpoint of end-use applications, and they provide both a qualitative and quantitative measure of flammability. The compositions of the invention are remarkable for their ability to demonstrate excellent flammability properties in such tests, as well as resistance to impact and high temperatures, along with improved flow and processing characteristics. The provision of such a combination of properties in a reasonably priced thermoplastic resin composition fills an important commercial need.

A further important advantage of the flame resistant blends of the invention resides in their ability to substantially maintain their initial color during processing. This is true especially if heat stabilizers (e.g., the conventional tin mercaptide stabilizers well known in the plastics industry) are incorporated.

The following examples, in which all quantities are expressed by weight, will serve to illustrate the practice of the invention in more detail.

EXAMPLE I

The ABS employed in this example contains 22.5 percent acrylonitrile, 26.5 percent butadiene, and 51 percent styrene-type monomer (18 percent styrene itself and 33 percent alpha-methyl-styrene). It is made by blending 53 parts of graft copolymer with 47 parts of separately prepared alphamethylstyrene-acrylonitrile (70/30 ratio) resin. The graft is a copolymer of 34 parts styrene and 16 parts acrylonitrile on 50 parts of poly (butadiene-costyrene) (90/10 ratio) rubber spine.

The thermoplastic polysulfone used is a commercially available resin supplied by Union Carbide Corporation (Polysulfone P-1700) and is composed of recurring units having the structural formula:

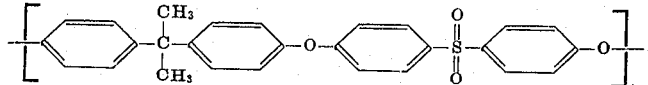

It may be prepared in accordance with Example 1 of the Robinson et al. patent referred to above.

Blends of 50 parts of the ABS plastic and 50 parts of the polysulfone resin are prepared by mechanically mixing the two materials in a Banbury mixer at 460° F for three minutes. These blends are sheeted off on a 350° F mill and diced.

The ABS polysulfone blend material is recharged to the Banbury and fluxed at 350° F to obtain a melt. Hexabromobenzene, or hexabromobenzene with antimony oxide, are added, to provide a series of blends having varying amounts of the flame-proofing agents. The hexabromobenzene contains 87 percent bromine. The antimony oxide is a commercial preparation known as Thermogard S, containing 83.5 percent antimony. The resulting blends are sheeted off on a 350° F mill and diced. This mixing method is termed a double processing technique.

Test specimens are prepared by injection molding the various blends using a standard screw machine. Flame test specimens in 1/16 inch thickness are prepared by compression molding. The properties for the various formulations may be found in Table I. It is important to note that a thermoplastic compound rated self-extinguishing (SE 1) by the Underwriters' Laboratories No. 746 Flammability Test, results when 10 percent by weight bromine or 5 percent by weight bromine with antimony oxide is incorporated into the polymer blend. The improvement in the G.E. Flammability Index Rating from 22.5 percent for the unmodified blend to 30.0 percent for the blend containing 5 percent by weight bromine with antimony oxide, as shown in Table I, further illustrates the excellent self-extinguishing characteristics of the modified blend. These self-extinguishing ratings are obtained without sacrificing high heat distortion temperature (measured by ASTM method D648-56 [1961]) or other physical properties, i.e., impact, tensile, flexural strengths, etc. In fact, processability as measured by Mooney viscosity (Table I) and by a Brabender Plasticorder (see the drawing) of the self-extinguishing blends is improved such that the compounds may be processed at lower temperatures. In the graph shown in the drawing the results of Brabender Plasticorder examination of two samples are shown. The data are for 50 gram samples, at a speed of 120 RPM, temperature 450° F. The upper curve is obtained on a control stock similar to Stock I—1 of Table I, containing no flame retardant additives.

TABLE I

[Self-extinguishing ABS/polysulfone blends]

| Stock | I-1 | I-2 | I-3 | I-4 | I-5 | I-6 |
|---|---|---|---|---|---|---|
| Forulation (parts): | | | | | | |
| 1. 50% ABS/50% polysulfone | 100 | 89.65 | 87.35 | 95.54 | 92.42 | 89.39 |
| 2. Hexabromobenzene (87% Br) | | 10.35 | 12.65 | 3.45 | 5.75 | 8.05 |
| 3. Antimony oxide (83.5% Sb) | | | | 1.01 | 1.83 | 2.56 |
| Bromine analysis, percent | | 7.93 | 11.02 | 3.55 | 5.02 | 6.94 |
| Antimony by wet ash test, percent | 0.09 | 0.15 | 0.22 | 0.91 | 1.44 | 2.20 |
| Hardness, Rockwell R | 114 | 115 | 115 | 114 | 116 | 116 |
| Notched izod, ⅛" at RT, ft.-lbs. per in | 13.2 | 10.3 | 9.6 | 11.6 | 9.5 | 9.5 |
| Notched izod, ⅛" at −20° F., ft.-lbs. per in | 2.3 | 2.6 | 2.3 | 1.8 | 2.0 | 1.9 |
| HDT, 264 p.s.i., annealed, ° F | 270 | 264 | 283 | 275 | 284 | 291 |
| Tensile strength, p.s.i. | 7,590 | 7,800 | 7,640 | 7,840 | 7,860 | 7,820 |

TABLE I—Continued

[Self-extinguishing ABS/polysulfone blends]

| Stock | I-1 | I-2 | I-3 | I-4 | I-5 | I-6 |
|---|---|---|---|---|---|---|
| Tensile modulus, p.s.i.×$10^5$ | 3.1 | 3.3 | 3.0 | 3.0 | 3.0 | 2.8 |
| Flexural strength, p.s.i.×$10^5$ | 10,180 | 10,420 | 10,560 | 11,000 | 10,900 | 10,980 |
| Mooney viscosity at 450° F., ML-5 | 57 | 43 | 41 | 52 | 48 | 46 |
| Vertical 1/16" | B-D | B-C | SE 1 | B-D | SE 1 | SE 1 |
| Horizontal, 1/16" | BD 1.63" | SE | SE | SE | SE | SE |
| G.E. flammability index | 22.5 | | | | 30.0 | |

NOTES.—B-D=burns and drips; B-C=burns and ignites cotton; SE=self-extinguishing; SE 1=self-ext., Group 1.

The lower curve is obtained on a stock of the invention, similar to Stock I-5 of Table I, containing the flame resistant additives. The superior processability of the composition of the invention is apparent.

Example I may be repeated, using an ABS containing 51 percent styrene itself as the styrene-type monomer, in place of 18 percent styrene, 33 percent alpha-methylstyrene(i.e., the separately prepared resin is a styrene-acrylonitrile copolymer rather than an alpha-methylstyrene-acrylonitrile copolymer). The example may be repeated using other polysulfone resins, such as that derived from alpha, alpha'-bis (4-hydroxyphenyl)-p-diisopropylbenzene and 4,4'-dichlorodiphenyl sulfone (see Ser. No. 847,427).

EXAMPLE II

In this example, the same ABS and the same polysulfone are used as in Example I, but the mixing technique is varied in the several stocks shown in Table II. In stock II-5, the same processing technique is used as in Example I, called the double processing technique. In stocks II-1 and II-3, a processing technique called the one-shot technique is employed. This involves charging initially all ingredients to the Banbury and intensely mixing for approximately 3 minutes until the temperature of the mix (melt temperature) is 460° F. The blend is then sheeted off on a 350° F mill and diced. Stocks II-2 and II-4 utilize what is termed the incremental technique, according to which the polysulfone and ABS are charged initially to the Banbury mixer. The polymers are mechanically worked until fluxed at 460° F. At this time the chemical additives (hexabromobenzene-antimony oxide) are charged and thoroughly mixed into the melt for one minute. The blend is then sheeted off on a 350° F mill and diced. Table II shows that the properties of the resulting blends are not significantly altered by the compounding techniques.

EXAMPLE III

It is important to note that many of the accepted halogenated flame retardants are not effective in the polysulfone/ABS polymer blend system due to the higher processing temperatures required when handling the blend. To demonstrate this, blends of the polysulfone and ABS plastic of Example I with tetrabromophthalic anhydride (Stock III-2 in Table III) and decachlorobiphenyl (Stock III-3 in Table III) are prepared by the double processing mixing technique. Sample specimens of these blends prepared by screw injection molding are discolored and initial signs of degradation are evident. The blends do not demonstrate sufficient thermal stability for commercialization. In addition, physical and flame properties are not comparable to those of the blends of the invention (Stock III-1; also Tables I and II).

TABLE III

[Various additives in self-extinguishing ABS polysulfone blends]

| Stock | III-1 | III-2 | III-3 |
|---|---|---|---|
| Formulation (parts): | | | |
| 1. 50% ABS/50% polysulfone | 92.42 | 89.30 | 84.47 |
| 2. Hexabromobenzene (87% Br) | 5.75 | | |
| 3. Tetrabromophthalic anhydride (67% Br) | | 8.85 | |
| 4. Decachlorobiphenyl (71% Cl) | | | 9.78 |
| 5. Antimony oxide (83.5% Sb) | 1.83 | 1.85 | 5.75 |
| Percent bromine analysis | 4.78 | 4.46 | |
| Percent chlorine analysis | | | 7.1 |
| Percent antimony by net AJH test | 1.49 | 1.77 | 4.72 |
| Hardness, Rockwell "R" | 114 | 116 | 111 |
| Notched izod, 1/8" at RT, ft.-lbs. per in | 10.0 | 5.8 | 9.2 |
| Notched izod, 1/8" at -20, ft.-lbs. per in | 1.9 | 0.9 | 2.0 |
| HDT, 264 p.s.i., annealed (° F.) | 285 | 263 | 270 |
| Tensile strength, p.s.i. | 7,920 | 8,364 | 7,200 |
| Tensile modulus, p.s.i.×$10^5$ | 3.5 | 3.4 | 3.2 |
| Mooney viscosity at 450° F | 42 | 38 | 39 |
| Appearance, color | (1) | (2) | Tann |
| UL #746: | | | |
| Vertical, 1/16" | SE 1 | SE 1 | B-ND |
| Horizontal, 1/16" | SE | SE | B-D |

[1] Light tan.
[2] Brown (degraded).

NOTE.—B-D=burns and drips; B-ND=burns and non-dripping; SE=self-extinguishing; SE 1=self-extinguishing Group 1.

TABLE II

[Self-extinguishing ABS/polysulfone blends mixing techniques]

| Stock | II-1 | II-2 | II-3 | II-4 | II-5 |
|---|---|---|---|---|---|
| Formulation (parts): | | | | | |
| 1. 50% ABS/50% polysulfone | | 87.35 | | 92.42 | 92.42 |
| 2. Polysulfone | 43.68 | | 46.21 | | |
| 3. ABS | 43.68 | | 46.21 | | |
| 4. Hexabromobenzene (87% Br) | 12.65 | 12.65 | 5.75 | 5.75 | 5.75 |
| 5. Antimony oxide (83.5% Sb) | | | 1.83 | 1.83 | 1.83 |
| Bromine analysis, percent | 9.96 | 11.1 | 5.18 | 5.11 | 4.78 |
| Antimony by wet ash test, percent | | | 1.74 | 1.60 | 1.49 |
| Compounding technique | (1) | Incr. | (1) | Incr. | (2) |
| Hardness, Rockwell R | 112 | 113 | 113 | 113 | 114 |
| Notched izod, 1/8" at RT, ft.-lbs. per in | 8.8 | 8.8 | 8.2 | 8.8 | 10.0 |
| Notched izod, 1/8" at -20° F., ft.-lbs. per in | 2.1 | 2.3 | 1.8 | 1.7 | 1.9 |
| HDT, 264 p.s.i., annealed, ° F | 264 | 271 | 284 | 285 | 285 |
| Tensile strength, p.s.i. | 7,320 | 7,340 | 7,500 | 7,460 | 7,920 |
| Tensile modulus, p.s.i.×$10^5$ | 3.2 | 3.4 | 3.4 | 3.4 | 3.5 |
| Flexural strength, p.s.i.×$10^5$ | 10,580 | 10,280 | 10,750 | 10,660 | 11,330 |
| Mooney viscosity at 450° F., MLX-5 | 33 | 31 | 36 | 37 | 42 |
| UL #746: | | | | | |
| Vertical, 1/16" | SE 1 | SE 1 | SE 1 | SE 1 | SE 1 |
| Horizontal, 1/16" | SE | SE | SE | SE | SE |
| G.E. flammability index | | | 29.7 | 30.3 | 30.0 |

[1] One shot.
[2] Double proc.

NOTE.—SE=self-extinguishing; SE 1=self-extinguishing, Group 1.

EXAMPLE IV

Using the same ABS and polysulfone resin as in Example I, the composition represented in Table IV may be prepared by the double processing mixing technique, using hexabromodiphenylether as the flame-retardant additive. The hexabromodiphenylether employed is a commercial preparation known as NC–1901 (Dow Chemical) having a molecular weight of 639.4, containing 74.5 percent bromine. It is in the form of a white solid, having a melting point of 170° C and a decomposition point of 415° C. Thermal gravimetric analysis results (10° C/min.) are reported as: 10 percent, 285° C; 50 percent, 335° C. The properties of blend are given in Table IV. The General Electric oxygen index flammability test is performed, giving an oxygen index of 28.7 for the described blend, as compared to a value of only 21–22 for a similar ABS-polysulfone resin blend not containing the additives of the invention.

Table IV

Use of Hexabromodiphenylether in ABS-Polysulfone Blend

| | |
|---|---|
| 50% ABS/50% Polysulfone | 91.6 parts |
| Antimony oxide (83.5% Sb) | 1.8 parts |
| HBDPE | 6.6 parts |
| 1/8″ Notched Izod at R.T. | 10.5 ft-lbs. per in. |
| 1/8″ Notched Izod at −20°F | 1.8 ft-lbs. per in. |
| Hardness, Rockwell R | 114 |
| Heat distortion temp. | 280°F |
| Tensile Strength | 7660 psi |
| Tensile Modulus | 3.1 × 10⁵ psi |
| Oxygen Index | 28.7 |

Having thus described our invention, what we claim and desire to protect by Letters Patent is:

1. A synthetic thermoplastic resin composition comprising a blend of
   A. from 30 to 70 parts by weight of a linear thermoplastic polyarylene polyether polysulfone resin,
   B. correspondingly from 70 to 30 parts by weight of acrylonitrile-butadiene-styrene polymeric material,
   C. a self-extinguishing additive selected from the group consisting of
      i. 4 to 14 parts of hexabromobenzene or hexabromodiphenylether, and
      ii. a mixture of 4 to 7.5 parts of hexabromobenzene or hexabromodiphenylether and 1.5 to 5 parts of antimony oxide, per 100 parts by weight of (A) plus (B).

2. A composition as in claim 1 in which at least 20 percent of the linkages between the arylene groups in (A) are sulfone groups.

3. A composition as in claim 1 wherein (A) is composed of recurring units having the formula $$-O-E-O-E'-$$

wherein E is the residuum of a dihydric phenol and E' is the residuum of a benzenoid compound having an inert electron withdrawing group in at least one of the positions ortho and para to the valence bonds, where both of said residua are valently bonded to the ether oxygens through aromatic carbon atoms, and at least one of E and E' provide a sulfone linkage between aromatic carbon atoms.

4. A composition as in claim 1 wherein (A) is composed of recurring units having the formula:

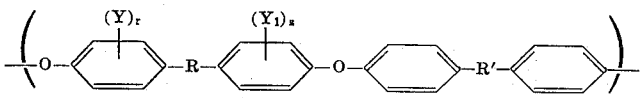

wherein R represents a member of the group consisting of a bond between aromatic carbon atoms and a divalent connecting radical and R' represents sulfone, Y and Y₁ each represent inert substituent groups selected from the group consisting of halogen, alkyl groups having from one to four carbon atoms and alkoxy groups having from one to four carbon atoms and where r and z are integers having a value from 0 to 4 inclusive.

5. A composition as in claim 1 wherein (A) is composed of recurring units of the formula:

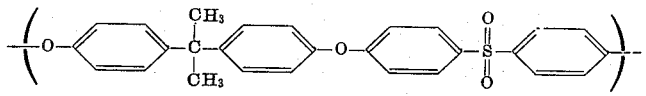

6. A composition as in claim 1 in which at least a part of the styrene in (B) is replaced by alpha-methylstyrene.

7. A composition as in claim 1 in which (B) comprises a graft copolymer of styrene and acrylonitrile on a rubbery spine selected from polybutadiene and butadiene-styrene copolymer.

8. A composition as in claim 1 wherein (A) amounts to 48–60 parts and (B) amounts to correspondingly 52–40 parts.

9. A composition as in claim 1 in which (C) is hexabromobenzene.

10. A composition as in claim 1 in which (C) is hexabromodiphenylether.

11. A composition as in claim 1 in which (C) is hexabromobenzene and antimony oxide.

12. A composition as in claim 1 in which (C) is hexabromodiphenylether and antimony oxide.

13. A composition as in claim 1 wherein (A) contains alkylidene linkages between arylene groups.

14. A composition as in claim 5 in which (B) comprises a mixture of (I) a graft copolymer of styrene and acrylonitrile on a rubbery spine selected from polybutadiene and butadiene-styrene copolymer, and (II) separately prepared alpha-methylstyrene-acrylonitrile resin.

15. A composition as in claim 14 in which (C) is hexabromobenzene.

16. A composition as in claim 14 in which (C) is hexabromodiphenylether.

17. A composition as in claim 14 in which (C) is hexabromobenzene and antimony oxide.

18. A composition as in claim 14 in which (C) is hexabromodiphenylether and antimony oxide.

19. A composition as in claim 7 in which (B) contains separately prepared alpha-methylstyrene-acrylonitrile resin.

20. A composition as in claim 19 wherein (A) amounts to 48–60 parts and (B) amounts to correspondingly 52–40 parts, and the bromo-aryl compound is hexabromobenzene.

21. A composition as in claim 19 wherein (A) amounts to 48–60 parts and (B) amounts to correspondingly 52–40 parts, and the bromo-aryl compound is hexabromodiphenylether.

* * * * *

PO-1050
(5/69)

UNITED STATES PATENT OFFICE
CERTIFICATE OF CORRECTION

Patent No. 3,686,362      Dated August 22, 1972

Inventor(s) Paul D. Hinckley et al.

It is certified that error appears in the above-identified patent and that said Letters Patent are hereby corrected as shown below:

Column 12, line 46, for the claim reference numeral "1", read --2--.

Signed and sealed this 22nd day of May 1973.

(SEAL)
Attest:

EDWARD M. FLETCHER, JR.
Attesting Officer

ROBERT GOTTSCHALK
Commissioner of Patents